United States Patent [19]

Uchino et al.

[11] Patent Number: 5,050,969
[45] Date of Patent: Sep. 24, 1991

[54] PHOTO-DRIVEN SWITCHING APPARATUS

[75] Inventors: Kenji Uchino, Yokohama; Kazuyasu Hikita, Chichibu; Mikiya Ono, Tokorozawa, all of Japan

[73] Assignee: Mitsubishi Mining and Cement Company Ltd., Japan

[21] Appl. No.: 456,970

[22] Filed: Dec. 26, 1989

[30] Foreign Application Priority Data

Dec. 26, 1988 [JP] Japan .................................. 63-325909
Jan. 20, 1989 [JP] Japan ........................................ 1-9959

[51] Int. Cl.$^5$ ............................................. G02B 5/30
[52] U.S. Cl. ..................................... 359/246; 359/244
[58] Field of Search ................ 350/374, 392, 360–361, 350/384, 370, 373

[56] References Cited

U.S. PATENT DOCUMENTS

| | | | |
|---|---|---|---|
| 3,975,632 | 8/1976 | Glass et al. | 250/212 |
| 4,154,505 | 5/1979 | Kato et al. | 350/374 |
| 4,221,463 | 9/1980 | Barsack et al. | 350/374 |
| 4,974,945 | 12/1990 | Kumada | 350/392 |

FOREIGN PATENT DOCUMENTS 60-39630  3/1985  Japan .................................. 350/374

OTHER PUBLICATIONS

Cutdown et al., PLZT electrooptic shutters: applications, Applied Optics, vol. 14, No. 8, Aug. 1975, pp. 1866–1873.

Primary Examiner—Rodney B. Bovernick
Assistant Examiner—James Phan
Attorney, Agent, or Firm—Hoffman, Wasson & Gitler

[57] ABSTRACT

A photo-driven switching apparatus in which a light beam is switched or modulated by using only light beam(s), comprising (a) a dielectric substrate having "photovoltaic effect"; (b) one or more couples of electrodes formed in or on at least portions of the surface(s) of the substrate so as to polarize the portion(s) positioned between the couple(s) of the electrodes thereby, (c) one or more photo-driving or photo-receiving elements provided at least in the polarized portion(s) of the surface of the dielectric substrate, having a polarization direction arranged at one certain direction, and having photovoltaic effect so as to generate photovoltage; (d) a dielectric rotation element comprising a light beam switching passage or modulator having a couple of polarizers, the polarization direction of each of which is perpendicularly crossed or parallel to each other, positioned on the surface of incoming of a light beam to be modulated, and at the surface of outgoing of the light beam, and a couple of electrodes formed on a couple of the other surfaces facing to each other of the element to apply an electric field in the element; (e) connecting leads connecting electrically the electrodes of the photo-driving elent(s) respectively to the electrodes of the element; the light beam to be modulated being incoming through the polarizer into the element through which the light beam passes to be switched or modulated; and the switching passage being operated directly the the photovoltage generated by the photo-dirving element(s) which can be operated or switched only by illumination of ultra-violet ray to the surface of said photo-driving element(s).

10 Claims, 6 Drawing Sheets

PHOTO-DRIVEN SWITCHING APPARATUS

FIELD OF THE INVENTION

The present invention relates to a photo-driven optical switching apparatus in which a photo-beam can be directly driven or switched only by using other light beam, without any electrical modulator. Particularly, it relates to a photo-driven optical shutter which can be easily miniatured or can be assembled into a very thin form.

DESCRIPTION OF THE PRIOR ART

A prototype photo-driven optical switching was constructed using an element having photovoltaic effect as the driver. There have been proposed in an article of 27a-LJ-7 "Trial Construction of Whole Light Driven Electro-optical Device" described at page 80 of the combined papers at a spring meeting of Japan Physic Society in 1987, and "Effect of Impurity Doping on Photostriction in Ferroelectric Ceramics" described in Sensors and Materials, 1 (1988) pp.47–56, a whole light driven device in which "electro-optical effect" to change the refractive index of the material by applying electric field in the material is used in combination with "bulk photovoltaic effect" to generate or induce the photovoltage the magnitude of which is well above the band gap energy of an piezoelectric crystal when irradiation such as ultra-violet irradiation is applied to the crystal polarized material, thereby, a photo-shatter can be driven by the induced photovoltage, and switching of light beam, i.e. red light beam can be switched or modulated, even without any electrical device. Such whole light driven optical switching apparatus is shown in FIG. 1 wherein a substrate 6 is a slide glass plate, two photo-receiving ceramic parts (driving parts) 1, that is, photo-driving devices, are provided thereon. The device will be operated in the way wherein a photovoltaic voltage or current is generated in the photo-receiving element (driving part) 1 by excitation due to irradiation from light of mercury lamp 3, and then, the electromotive force generated by such photovoltaic voltage will drive a light shutter 2.

Two photo-driving parts, i.e. photo-receiving elements A and B are connected by an electric circuit in order to generate inverse photovoltaic voltage in each elements, and then, when the elements A and B are alternatively irradiated by switching a mercury lamp(s), the red light from He-Ne laser can be switched or modulated as shown in FIG. 2 to produce 0.2 Hz wavenumber light beam with the S/N ratio of about 2 dB. The material for the photo-receiving element(s) driving parts) is PLZT(3/52/48) which is referred to $Pb_{0.97}La_{0.03}(Zr_{0.52}Ti_{0.48})_{0.9925}O_3$, and the material for the photo-shatter 2 is PLZT(9/65/35) which means $Pb_{0.91}La_{0.09}(Zr_{0.65}Ti_{0.35})_{0.9775}O_3$. Further, the effect of impurity doping on the photostriction in PLZT ceramics was studied on $WO_3$ doping to find that the doping less than 1.5 atomic percent of $WO_3$ can improve the photostriction as compared with no doping PLZT ceramics. [refer to "Effect of Impurity Doping on Photostriction in Ferroelectric Ceramics" by M. Tanimura and K. Uchino, Sensors and Materials, 1, 46 (1988)]

However, such constructed known photo-driven optical shutter seems to have the following shortcomings;

(1) Because a photo-receiving element is put on the surface of the material, the optical switching device cannot be miniatured nor assembled in thin form:

(2) Because the lead is used, the assembling cost will be high:

(3) Because a red signal light beam (to be switched or modulated), and a light beam from a mercury lamp to drive the signal beam are incident mostly from the same direction, it is necessary to avoid confusion between the driving light and a light beam to be modulated;

(4) Because the light beam to be modulated enters at the direction to pass through the substrate, the beam to be modulated can be affected by the substrate, that is, the substrate should be transparent, and further, if the substrate is of the material with less transparency, the S/N ratio of the photo-signal beam as modulated will be lowered, and in the other words, the selection of the material for the substrate will be restricted.

Many attempts have been made to resolve these problems in the structure and the assemble of a photo-driven optical switching apparatus.

SUMMARY OF THE INVENTION

With the foregoing considerations in mind, the present invention contemplates the provision of a photo-driven optical switching device using a piezoelectric material having "bulk photovoltaic effect", e.g. $Pb_{0.97}La_{0.03}(Zr_{0.52}Ti_{0.48})_{0.9925}O_3$: PLZT(3/52/48) as a photo-receiving element, i.e. a photo-driving element so that photo-induced voltage will be generated in the photo-receiving element when radiation illuminates to it, wherein the photo-induced voltage will drive a photo-modulator utilizing "electro-optic effect".

In the inventive photo-modulator, a driving light can modulate or switch a light beam without any electrical amplifier and any mechanical elements. The inventive device comprises (a) element(s) to generate a photovoltage by exposing to the driving light, (b) a electro-optic ceramic element(s) to provide a rotation or twist to the vibration direction of the polarized light by applying the voltage from the generated photovotage, which element is sandwiched between two crossed polarizers, thereby, to produce an optical shutter, and (c) circuit(s) electrically connecting the electrodes of the photovoltaic element with the electrodes of the rotation element. Therefore, the photovoltaic element has a bulk photovoltaic effect, and then the term of "photovoltaic effect" means a phenomenon in which voltage is generated in a dielectric material by exposing to a light, particularly to a ultra-violet ray. The rotation (electro-optical) element to be used in the inventive device for providing a rotation or twist to the vibration direction of the polarized light has "electro-optical effect" or "Kerr effect". Therefore, the term of "electro-optical effect" hereinafter refers to as "effect or phenomenon in which the change of birefringence $\Delta n$ is occured in the material to which the voltage or electice field is applied, in term of $\Delta n = -\frac{1}{2} \times n_0^3 R_{33} E^2$, wherein $n_0$ is the index of refraction, $R_{33}$ is a quadratic electro-optical index, and E is the electric field". In the inventive switching apparatus, the photo-voltage in order of $-kV/cm$, is generated in the photo-voltaic element by exposing to high energy radiation light, and then, is applied between a couple of the electrodes mounted on the surfaces of the electro-optical element to provide the change of birefringence so as to rotate or twist the vibration direction of the polarized light. If such a rotation is provided, an optical shutter can be constructed utilizing two crossed polarizers along with the rotation element sandwiched between the polarizers. Thus, incoming polarized light will be blocked by the second polarizer if there is no rotation and passed by the second polarizer if there is 90° rotation. Therefore, the term of "modulation or switching" hereinafter includes "switching, rotating the vibration direction of the light beam, and changing the brightness of the light beam".

It is an object of the present invention to provide a miniaturizable photo-driven optical schutter switchable or operatable only by a light beam.

It is another object of the present invention to provide a photo-driven optical optical switching device which can be easily miniatured, and is light weighted and can be formed in thin integrated form.

It is further object of the present invention to provide a photo-driven optical optical switching device which structure can be uncostly fabricated by using leads or circuits formed on the surfaces of the substrate, and decreasing the number of the components thereof.

It is further other object of the present invention to provide a photo-driven optical optical switching apparatus which has high cost performance, and high reliability and high operation features.

DETAILED DESCRIPTION OF PREFERRED EMBODIMENTS

Figure 1:
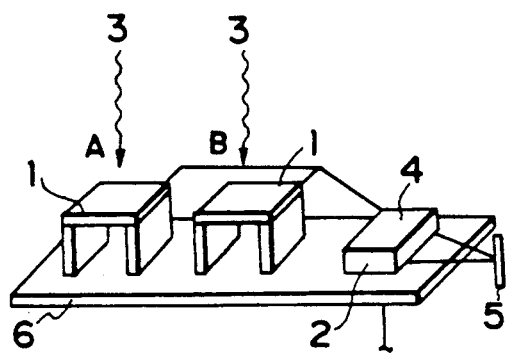
FIG. 1 shows schematically the structure of the prior art photo-driven apparatus in sectional views.
Figure 2:
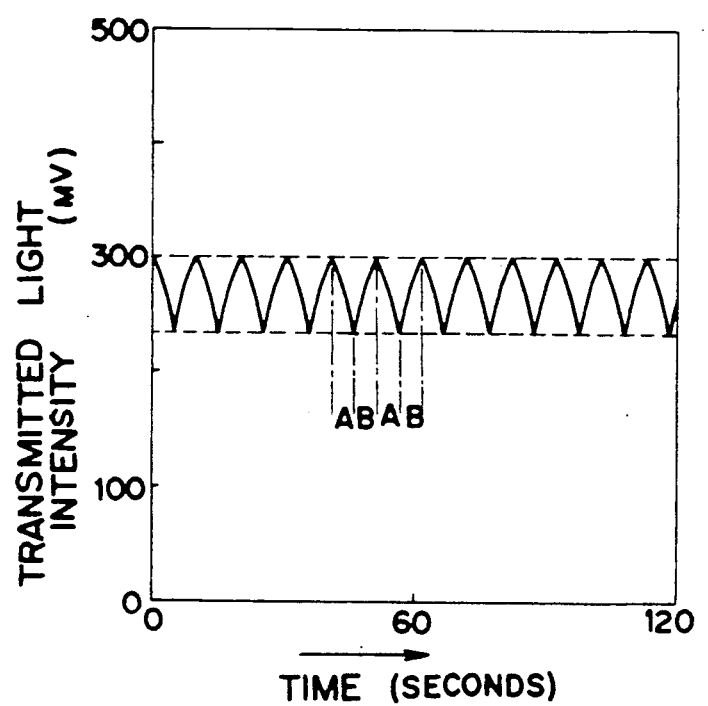
FIG. 2 shows a graph plotted on co-ordinate of change of the light intensity of transmitting laser beam and on time period resulting from the prior art whole light driven device.

In accordance with the present invention, a photo-driven optical switching apparatus can modulate or switch a light beam by irradiating photo-driving or photo-receiving part(s) formed on a substrate. In the inventive photo-driven switching device, a light beam can be switched or modulated by switching an ultra-violet light beam for the photo-driving elements formed on the substrate.

The inventive device comprises (a) a dielectric and photovoltaic substrate having "photovoltaic effect"; (b) one or more couples of electrodes formed in or on at least portions of the surface(s) of said substrate so as to polarize the portion(s) positioned between said couple(s) of the electrodes thereby, (c) one or more photo-driving or photo-receiving elements provided at least in the polarized portion(s) of the surface of said dielectric substrate, having a polarization direction arranged at one certain direction, and having photovoltaic effect; (d) a dielectric material having electro-optical effect, comprising a light beam switching passage or modulator having a couple of polarizers, the polarization direction of each of which is perpendicularly crossed or parallel to each other, positioned on the surface of incoming of a light beam to be modulated, and at the surface of outing of the light beam, and a couple of electrodes formed on a couple of the other surfaces facing to each other of crystal material to apply an electric field in said crystal material; (e) connecting leads connecting electrically said electrodes of said photo-driving element(s) respectively to the electrodes of said crystal material; the light beam to be modulated being incoming through said polarizer into said crystal material through which the light beam passes to be switched or modulated; and said switching passage being operated directly by the photovoltage generated by said photo-driving element(s) which can be operated or switched only by illumination of ultra-violet ray to the surface of said photo-driving element(s).

The incoming face and the outing face for the light beam to be modulated in said modulator are substantially perpendicular to the surface of said dielectric substrate and the receiving face of the photo-driving parts is parallel to the surface of said substrate, so that said light beam to be modulated incomes or enters from the direction in which there is no possibility of the beam entering through the surface of the substrate, and the driving ultra-violet light beam incoming from the direction different from that of the light beam to be modulated.

For improving the photo-voltage in this device, the number of the photo-receiving elements can be increased or the dielectric material to be used as the substrate is changed, for example, the more $WO_3$ amount can be added to the material of PLZT(3/52/48).

The response velocity of the device can be improved by improving the geography of the device.

The confusion of the light beam can be avoided by irradiating from the entirely different direction from each other of the irradiation beam and the light beam to be switched.

The dielectric substrate having photo-induced voltage effect, to be used for the photo-driven apparatus should have high photovoltaic effect. The most preferable composition of the material is a piezoelectric material having the chemical formula of $Pb_{0.97}La_{0.03}(Zr_{0.52}Ti_{0.48})_{0.9925}O_3$ with $WO_3$ doped.

The dielectric material with high electro-optical effect to be used for the light modulator in accordance with the present invention should have high clarity. The most preferable material is a lanthanum-doped lead titanate zirconate having the chemical formula of $Pb_{0.91}La_{0.09}(Zr_{0.65}Ti_{0.35})_{0.9775}O_3$.

In accordance with the present invention, photo-receiving element(s) are formed in the surface of a dielectric substrate having "photo-voltaic effect" and then, a ceramic or crystal material comprising a light beam switching passage or modulator is provided on the surface of the same substrate and then the photo-receiving elements and the modulator can be easily electrically connected on the same substrate. When the photo-receiving elements are irradiated in order to generate the photovoltage, which can operate the switching element of the inventive switching device, and therefore, the inventive switching apparatus can be operated or controlled only by a light beam without any use of electrical amplifier, and further without any use of other mechanical means.

Figure 3:
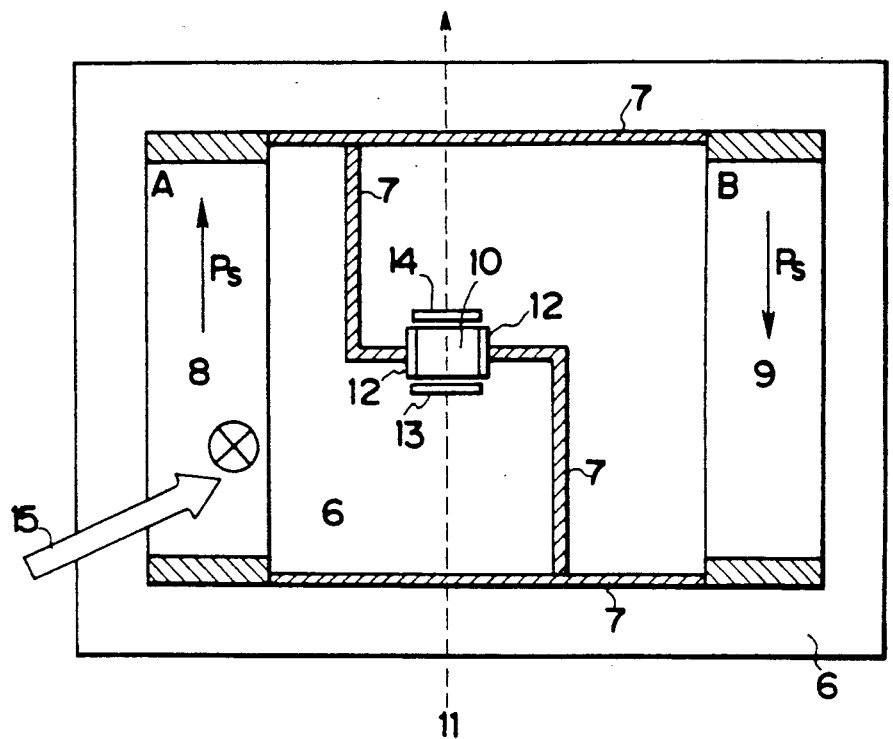
FIG. 3 is a plane view showing schematically the construction of the inventive photo-driven optical switching device.
Figure 4:
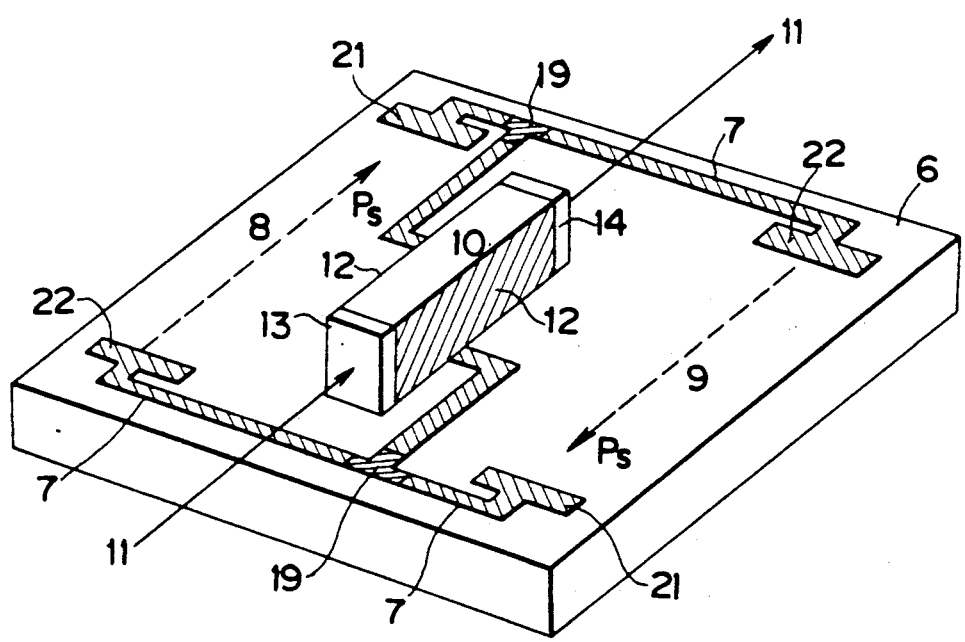
FIG. 4 shows schematically one example of the inventive photo-driven optical switching apparatus.
Figure 10:
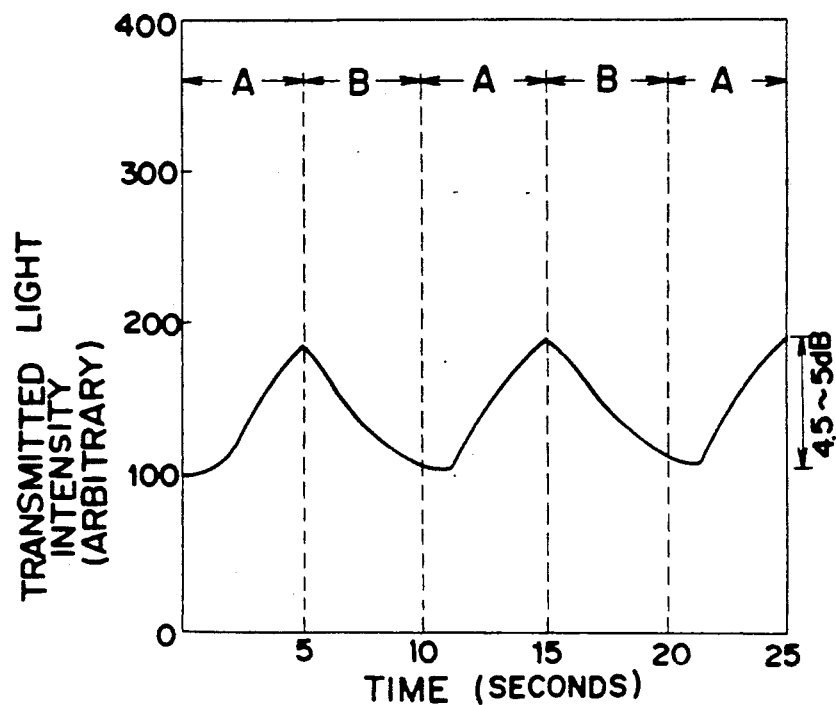
FIGS. 10 and 11 show graphs plotted on co-ordinate of output change of a modulated laser beam and on time period resulting from the inventive photo-driven optical switching device.
Figure 11:
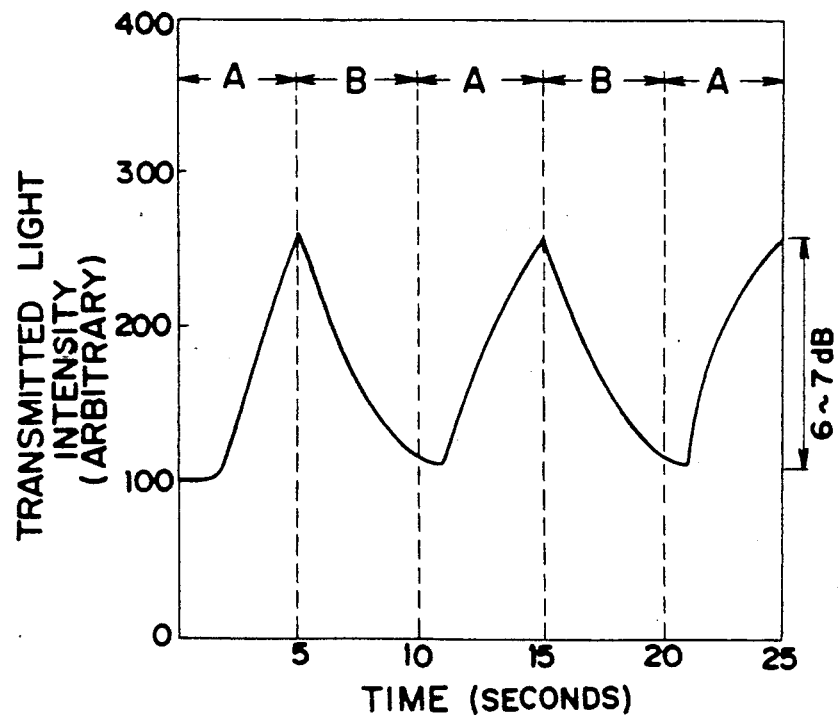

Switching can be controlled by alternately irradiating the two photo-receiving part, utilizing a dual beam method. The delay that ordinarily occurs in the off process due to a low dark conductivity can be avoided. FIGS. 3 and 4 shows a structure of the inventive photo-driven optical switching device. The On/Off response of the photo-driven optical switching is shown in FIGS. 10 and 11. The response, therefore, is found to be more than ten times as fast as that usually exhibited by the optical switching made from the conventional optical switching.

FIG. 4 shows schematically the inventive photo-driven optical switching device. In that construction, 6 is a dielectric substrate with bulk photo-voltaic effect generated by polarization, and 7 is electric leads formed on the surface of the substrate, connecting the electrodes of the photo-receiving elements A and B, so that the directions of the polarization in the elements is in series and the electrodes of the modulator is connected respectively to the electrodes of the photo-receiving elements.

A modulator 10 having electo-optical effect is provided on the surface of the substrate 6 in the orientation in that a light beam 11 passes through the modulator 10 parallelly to the surface of the substrate 6, and the electrodes 12 are formed on both surfaces of the transparent dielectric material 10, and will be charged to produce an electric field in the direction perpendicular to the direction of the light beam passage. Each of the electrodes of the modulator 10 is connected respectively to each of the electrodes of the photo-receiving elements 8 and 9 as shown in the drawings.

In FIG. 4, the photo-modulator 10 has two polarizers 13 and 14 at both of the incoming face and the outing face for the light beam 11. The polarization direction of the polarizers is at angle of 45° to the direction of the electric field applied, and is vertically crossed to each other at the face of incoming of a light beam, and at the face of outing of the modulated beam.

A driving light 15 is preferably from a mercury lamp, and the surface of the substrate is vertically irradiated by the mercury lamp.

Figure 5:
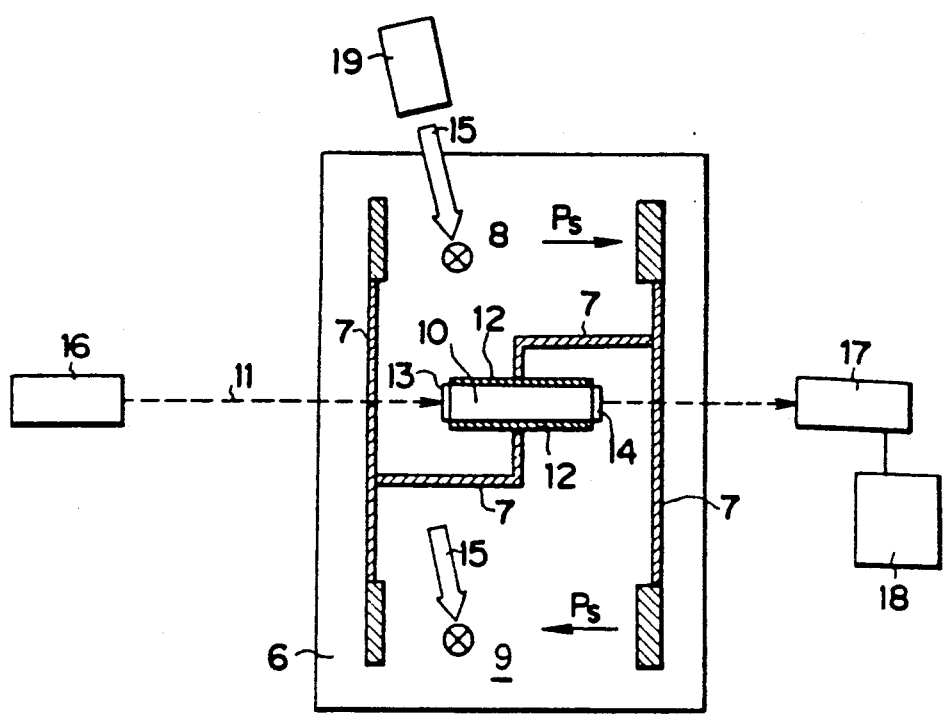
FIG. 5 shows schematically a construction of the apparatus for measuring the performance of the inventive photo-driven optical switching device.

In a construction of the apparatus for measuring the performance of the inventive photo-driven optical switching device as shown in FIG. 5, 16 is a He-Ne laser emitting a light beam to be modulated into a signal light, 17 is a sensing device for measuring the intensity of the modulated light beam, and 18 is a computer to record the data obtained by measuring the intensity of the light beam and the like with the sensing device 17. Further, 19 is a mercury lamp to produce a driving light beam 15. The driving light beam 15 radiates (illuminates) to either or both of the photo-receiving parts 8 and 9.

Figure 6:
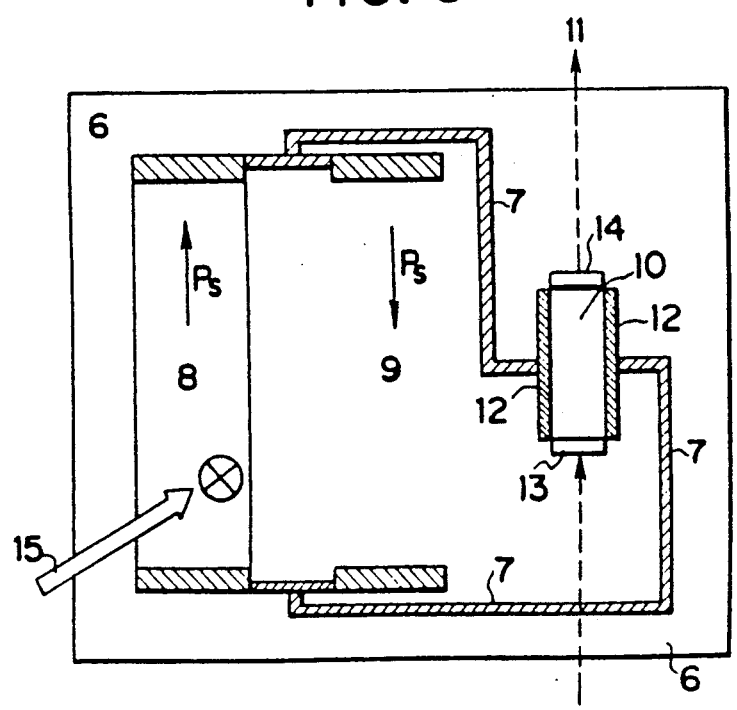
FIG. 6 is a schematic plane view showing the other example of the photo-driven optical switching device.

Next, FIG. 6 shows a schematic plane view showing the other example of the photo-driven optical switching device, in which the photo-modulator 10 is mounted at the outside of the loop forming the leads 7 connecting the electrodes of the photo-receiving parts 8 and 9 on the surface of the substrate 6. The two photo-receiving parts 8 and 9 are provided adjacent, and therefore, it is not necessary to deflect highly the driving light beam 15 in order to operate the photo-modulator or the photo-switching device.

Figure 7:
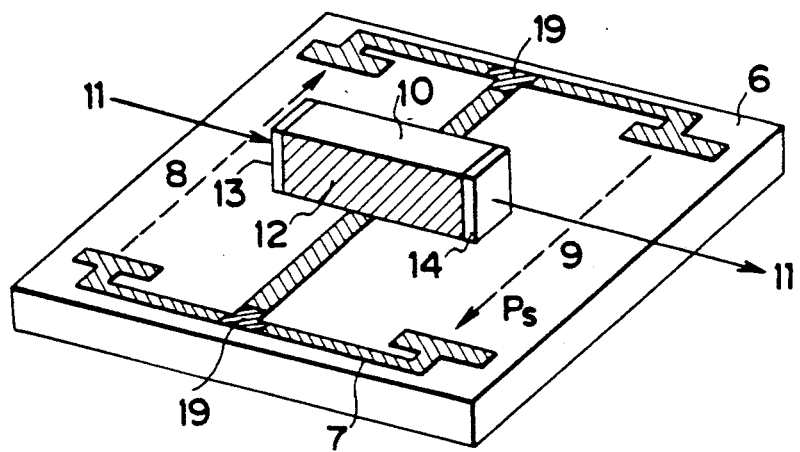
FIG. 7 shows schematically another example of the inventive photo-driven optical switching apparatus.

FIG. 7 shows schematically another example of the inventive photo-driven optical switching apparatus, in which the light beam 11 to be modulated in the modulator 10 is at the incident angle perpendicular to the direction of polarization of the photo-receiving parts 8 and 9 formed on the surface of the substrate.

FIGS. 8 A and 8 B show schematically further example of the inventive photo-driven apparatus, in which the photo-modulator 10 mounted on the opposite surface of the substrate to the surface on which the photo-receiving parts 8 and 9 are provided.

Figure 9:
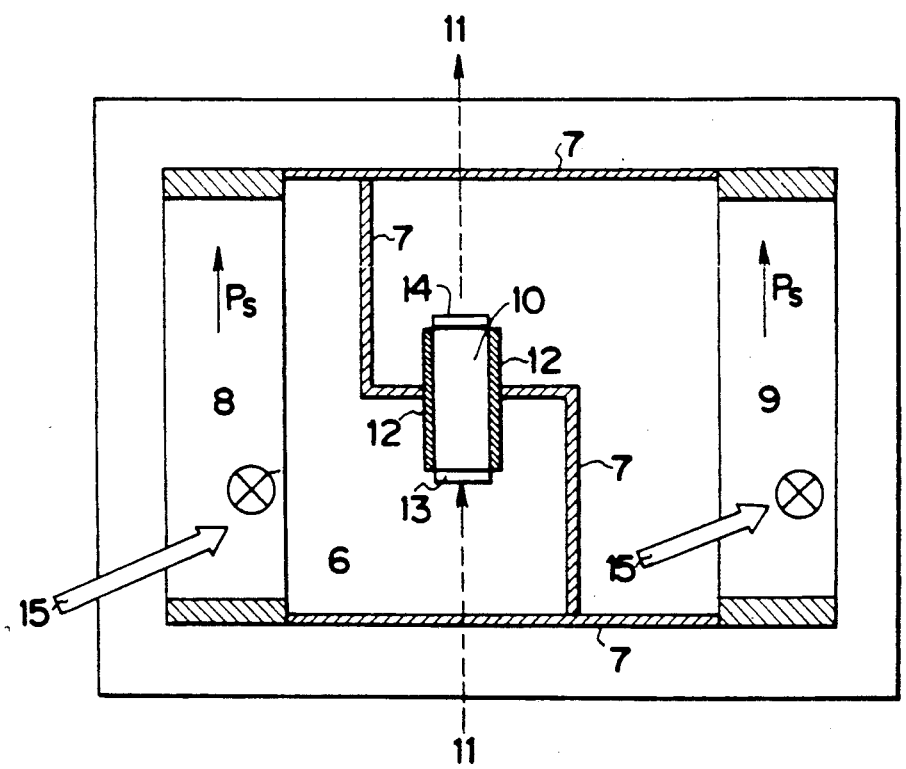
FIG. 9 is a plane view showing schematically the other example of the inventive photo-driven optical switching apparatus.

FIG. 9 is a plane view showing schematically the other example of the inventive photo-driven optical switching apparatus, in which the polarization of the photo-driving parts 8 and 9 is parallel to each other on the surface of the substrate 6, and the electrodes of the photo-driving parts are parallelly connected as shown in the drawings. Therefore, the response time will be a half of the response time by only one photo-driving parts, and in the other words, the operating speed of the photo-driven modulator will be twice of the ordinary one photo-driving part on the substrate.

The principle of the inventive photo-driven modulator will be illustrated as follows by using the measuring device as shown in FIG. 5.

When an electric field is not applied in the modulator 10 by loading an electric voltage on the electrodes 12, the light beam 11 can not enter into the modulator 10 because of polarizers 13 and 14 being orthogonal to each other, i.e. the directions of the polarizers being perpendicular to each other. Therefore, the light beam 11 can not be modulated in this case.

Next, when the photo-receiving part 8 is irradiated with a light beam 15 from a mercury lamp 19, the voltage generated due to a bulk photostrictional voltaic effect is applied on the electrodes of the photo-modulator 10 through the leads 7, and then, the light beam 11 being polarized linearly with the polarizer 13 at the incoming face of the modulator 10 enters into and passes through the field-applied modulator 10 so as to produce a light component being capable of passing the polarizer 14 at the outing face of the modulator 10 so that the outing light beam can be obtained.

Then, when the photo-receiving part is not irradiated, the modulator 10 is off (that means that the light beam 11 does not reach to the device 17), and when the photo-receiving part is irradiated, the modulator is on (meaning that the light beam 11 passes through the modulator), so that the light beam 11 can be controlled or modulated to produce a signal light beam by operating with the input light 15.

In the above-mentioned explanation, the operation of the inventive modulator is illustrated in case of the polarizers being orthogonal (at 90°) to each other, the modulator can be operated in the other cases, such as in the case of the polarizers being parallel to each other. In this case, when the photo-receiving part is not irradiated, the light beam can passes through the modulator to be "on", and when the photo-receiving part is irradiated by a mercury lamp, the modulator is "off". This is inverse to the former case.

Next, the light beam 15 from a mercury lamp 19 is deflected to the other photo-receiving part 9, and then, the inverse photovoltage to the photovoltage in the part 8 is generated because the polarization $P_s$ of the part 9 is opposite to that of the part 8. Therefore, the photo-shatter element 10 being "on" can be derived into "off" by applying the voltage inverse of the voltage by the part 8, to the electrodes of the photo-shatter element 10. Then, the passage of the driving light beam 15 can be deflected or changed on the parts 8 or 9, in order to modulate or control the light beam 11. As the result, there is provided a modulator of a light beam 11 by operating the other light beam 15.

FIGS. 10 and 11 show graphs plotted on co-ordinate of output change of a modulated laser beam and on time period resulting from the inventive photo-driven device.

The present invention is further illustrated by the following examples to show the structure of the inventive photo-driven apparatus, but should not be interpreted for the limitation of the invention.

EXAMPLE 1

[On-off switching]

A photo-driven device having the structure as shown in FIG. 4 was manufactured as follows:

First of all, a ceramic substrate 6 was made into a plate of 2.5 cm × 2.5 cm having the following composition.

Lead titanate zirconate of the ratio of Zr to Ti being 52:48 in which 3 atomic percent of La is substituted in place of Pb site, and having the formula;

$$Pb_{0.97}La_{0.03}(Zr_{0.52}Ti_{0.48})_{0.9925}O_3$$

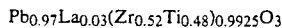

[hereinafter, refer to as PLZT(3/52/48)] is a composition of sintered plate, which was used as a substrate 6, and on the surface thereof was circuit pattern(s) 7 as shown in FIG. 4 made by printing a silver-palladium paste, and firing so as to form the circuit patterns 7.

Photo-receiving elements (photovoltaic response devices) 8 and 9 were formed having an electrode distance of 16 mm, and electrode size of 5 mm × 1 mm, and two couples of electrodes 21 and 22.

Then, a ceramic material of the composition of the formula;

$$Pb_{0.91}La_{0.09}(Zr_{0.55}Ti_{0.35})_{0.9775}O_3$$

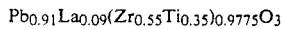

[hereinafter, refer to as PLZT(9/65/35)] in which 9 atomic percent of La is substituted in place of Pb site in a crystal of lead titanate zirconate, and a ratio of Zr to Ti is 65:35, which crystal is transparent and has a size of 2.5 mm × 4 mm × 15 mm was made. Then, silver-palladium paste is applied on both surfaces of 4 mm × 15 mm, and fired to form electrodes 12. The couple of the surfaces 13 and 14 perpendicular to the electrode surfaces were polished so as to form a couple of surfaces 13 and 14 having a size of 2.5 mm × 4 mm, for use in signal light receiving and emitting surfaces so much polished that signal light 11 could not be scattered at the surfaces.

The resulting crystal 10 was assembled on the surface of the substrate 6 of the composition; PLZT(3/52/48), as shown in FIG. 4, and connected by using a adherent agent on the surface.

On the couple of polished surfaces of the crystal 10 were a couple of polarizers 13 and 14 of "Polaroide (trademark)" plates bonded by adhesive agent. The polarizers have polarizing direction at 45° to the application direction of electric field, and the adhesives was applied to the sticking surfaces with avoiding the position through which the signal light passes, and cured so as to establish the assemble of this photo-driven apparatus.

The photo-receiving elements 8 and 9 were formed between the electrodes 21 and 22 formed on the dielectric substrate 6, and were polarized by applying electric field of 2 kV/mm, so as to form polarization direction reversing and parallel in the elements 8 and 9. After this procedure of polarization of the photo-receiving elements 8 and 9, the electrodes 21 and 22 were connected to circuits. The directions of spontaneous polarization of the elements 8 and 9 are arranged in a series, by connecting together the circuits at the positions 19 with soldering and the like so as to form the electric circuits 7, and then, a silver paste or solder curable at the room temperature was used to connect the photo-modulator 10 to the circuits patterns 7.

The operation characteristics of the photo-driven apparatus of FIG. 4 was measured by the method as shown in FIG. 5. The signal light for such measurement was a red laser beam 16 generated from He-Ne gas laser. The intensity of the signal light 16 having passed through the crystal 10 was measured as shown in FIG. 5, by a photo detector 17, and then the data as detected was processed and memorized by a computer 18.

The photo-receiving elements 8 and 9 made from PLZT(3/52/48) substrate 6 were alternately exposed to radiation from mercury lamp 19 at reciprocal interval of 5 seconds, and the response of the crystal photo-switching element to the signal light beam 16 was measured. The resulting response is shown in FIG. 10 showing a graph plotted on co-ordinate of output change of a laser and on time period resulting from the prior art whole light driven device.

When the driving light is irradiated to the element A, the photo-driven element is operated to be on. When the driving light is applied on the element B, the photo-driven element is operated off. The S/N ratio of the signal light beam was measured to be 4.5 to 5 dB.

In this example, polarizers 13 and 14 are bonded directly on the surfaces of the dielectric crystal 10 of the composition PLZT(9/65/35), but, the polarizers can be assembled indirectly and at the distance from the surfaces of the dielectric crystal 10, to yield the desired properties of the modulator 10.

It is apparent from this example that because the substrate itself is a piezoelectric body (crystal), the formation of the photo-receiving elements can be accomplished only by forming the electrodes on the surfaces of the substrate, and polarizing the portions between the electrodes, so as to produce the desired properties of the photo-receiving elements. Therefore, the manufacture of the elements can be facilitated, so that the miniaturization of the device can be easily accomplished. The assembling of the substrate with a transparent dielectric crystal can be exerted by adhering together with glass paste. Alternatively, the assembling can be accomplished by firing together at the high temperature of 1,000° to 1,300° C. to sinter together or to adhere or solder together, because both of the substrate and the dielectric crystal are of the similar material, that is, PLZT composition. In this procedure, two kinds of PLZT compositions were connected or integrated together, and then, the circuit patterns were formed, and polarization of the elements, the formation of the electrodes, and the connection of the electrodes with the circuits are accomplished and then the polarizers are provided on the both parallel surfaces of the piezoelectric material.

EXAMPLE 2

[Effect of $WO_3$ doping on PZT]

$WO_3$ doping sample of PLZT(3/52/48) doped with 0.5 atomic percent of $WO_3$ was used in place of the PLZT(3/52/48) for use in photo-receiving element (or photovoltaic effect device) in Example 1.

The size of the photo-receiving elements 8 and 9 is the same as in Example 1, and therefore, a couple of electrodes having the size of 5 mm×1 mm is provided at the distance of 16 mm, as shown in FIG. 4. The shape and polarization condition of the electrodes, and the structure of the photo-switching circuit are similar to those of Example 1. Then, the operation characteristics of the resulting device was measured, as described in Example 1. The result is shown in FIG. 11.

The resulting S/N ratio is about 6 to 7 dB.

Improvement of 1.5 to 2.5 dB was found as compared with the result of Example 1. This seems due to the effect of $WO_3$ doping in PLZT(3/52/48). Each of 1.0, 1.5, 2.0 and 2.5 atomic percents for $WO_3$ doping composition was used for preparation of the substrates, and each substrate was assembled to form the photo-driven optical device of the present invention, and the tests were carried out to measure the S/N ratio.

The result is that the S/N ratio obtained from the 1.0 and 1.5 atomic percents $WO_3$ doping PLZT(3/52/48) substrates is higher than that obtained from the non-doping substrate, and the S/N ratio obtained from the 2.0 atomic percent $WO_3$ doping PLZT(3/52/48) substrate is competitive with that from the non-doping substrate, and further, the S/N ratio of the 2.5 atomic percent $WO_3$ doping substrate is lower than that of the non-$WO_3$ doping substrate.

Accordingly, the preferable doping range for $WO_3$ is 0 to 2.0 atomic percent, and the improvement of S/N ratio by $WO_3$ doping was found.

EXAMPLE 3

[Photo-switching element provided outside of a photo-receiving element circuit]

This example is shown in FIG. 6 wherein a photo switching element 10 is arranged outside of a loop circuit constructing two photo-receiving elements 8 and 9.

The advantages of this structure is that the changing width of changing the angle of the driving light beam can be small, because the distance between the two photo-receiving elements formed on the surface of the substrate is small, that is, the two elements are adjacent together.

The material for the photo-receiving elements was the same as that of Example 2, that is, $WO_3$ doped PLZT composition, and then, S/N ratio was improved into 6 dB.

EXAMPLE 4

[Driving radiation enters into the device from the direction opposite to that of the light beam to be switched]

This example is a modification from Example 1 and is shown in FIG. 7.

The light beam 11 to be switched enters from the direction perpendicular to the polarization direction (shown by an arrow) of the photo-receiving elements 8 and 9, while the light beam 11 to be modulated in Example 1 enters from the direction parallel to the polarization direction of the photo-receiving elements 8 and 9. The other conditions are the same as those of FIG. 4 in Example 1.

EXAMPLE 5

[Photo-modulator constructed at the opposite side of the photo-receiving elements]

Figure 8A:
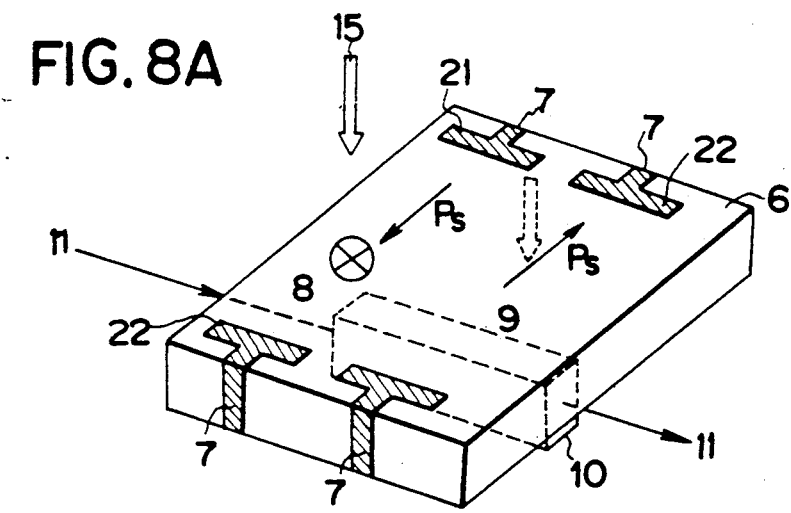
FIGS. 8 A and 8 B showing schematically further example of the inventive photo-driven optical switching apparatus.
Figure 8B:
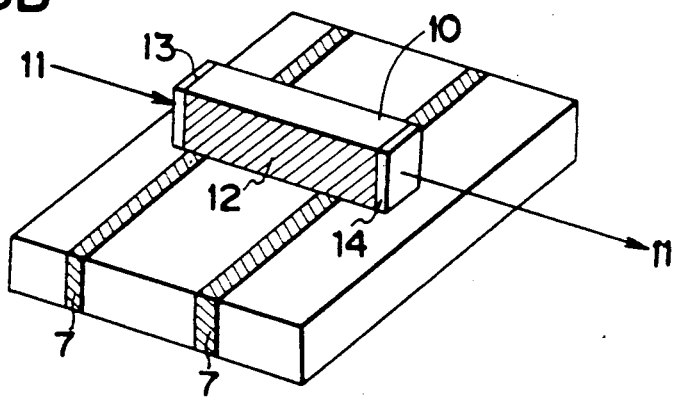

This example is shown in FIG. 8A and 8B. FIG. 8A is a perspective view seen from the bottom side of the substrate 6, and FIG. 8B is a perspective view seen from the photo-modulator 10 assembled side of the substrate 6.

The substrate 6 is 20 mm long, 15 mm wide and 0.5 thick, and a couple of electrodes 21 and 22, each having size of 5 mm×1 mm are provided on the bottom surface of the substrate 6 with the distance between both electrodes being 16 mm, and the circuits 7 for a photo-modulator 10 were formed on the opposite surface of the substrate 6. The photo-receiving elements 8 and 9 formed between the electrodes 21 and 22 were polarized in reverse and parallel form to each other, and the photo-optical switching modulator 10 was as shown in FIG. 8B, assembled on the opposite surface of the substrate 6.

A transparent ceramic crystal of the composition PLZT(9/65/35) was used for a photo-modulator 10 having size of 2.5×4×10 mm, and the electrodes 12 were formed on both surfaces of the crystal 10, which was adhered on the substrate 6, and the electrodes 12 were connected to the circuits 7 by solder or conductive paste, and further, the photo-receiving elements 8 and 9 were polarized and connected together in series form.

A photo-modulator 10 was connected in series of polarization, and the electrodes 12 for the photo-modulator 10 were electrically connected to the electrodes of the photo-receiving elements in parallel form.

The photo-receiving elements 8 and 9 were exposed to radiation of mercury lamp so as to generate a photovoltaic current and voltage in the circuits 7.

A light beam 11 to be modulated enters into the photo-modulator 10 at the direction perpendicular to the direction of the self-polarization of the substrate 6, and therefore, the risk of an optical confusion is in a very small possibility.

Further, both surfaces of the substrate can be used for assembling this optical device, and then, the whole size of the device can be compacted, and the device can be easily miniatured.

EXAMPLE 6

[Structure of parallel polarization of photo-receiving elements]

This example is shown in FIG. 9 wherein the photo-receiving elements 8 and 9 are polarized in the same and parallel polarization direction, and assembled and connected through an electrical circuit in parallel together.

The operation performance was measured in a way as shown in FIG. 5, that is, two photo-receiving elements 8 and 9 were simultaneously exposed to a driving radiation 15, so as to measure the performance of the photo-driven optical switching apparatus.

The material same as that used in Example 2 was used for the material of a dielectric ceramic substrate 6, that is, the PLZT(3/52/48) doped with 0.5 atomic percent of $WO_2$.

The time period from starting the radiation of a driving light to the point when a light beam passing through the photovoltaic effect 10 reaches to the intensity of 6 dB, was measured 2 to 2.5 seconds, that is about a half of the period when a driving light is irradiated only to one photo-receiving element, that is, a driving element, as described in Example 2.

It was confirmed that the use of the parallel arrangement of two photo-receiving elements having the same self-polarization direction for detecting photo-irradiation can enable more rapid response for opening of a shutter.

FIG. 10 is a graph showing a photo responsibility of the photo-controlling device of the present invention when the device is irradiated each other to two photo-receiving elements A and B having inverse polarization direction.

FIG. 11 is a graph showing a photo responsibility of the photo-controlling device of the present invention having the substrate material of 0.5 weight percent $WO_3$ doped PLZT.

The device of the present invention has a substrate of dielectric material having photovoltaic effect, photo-receiving elements formed directly in the surface of the substrate to generate a photo-induced current or voltage, and leads to lead the current or voltage from the electrodes of the photo-receiving or photo-driving element(s) to the electrodes of the dielectric crystal comprising a beam switching device or modulator, and said crystal comprising the beam switching passage or modulator to switch or modulate a light beam entering to the device to be modulated or switched.

Therefore, in this device, the photo-receiving or photo-driving elements and the switching device or photo-modulator are electrically connected, and then, a light beam can be switched or modulated directly by using only a driving light and without use of any amplifier.

Secondly, it can enable to fabricate easily a miniatured and light-weighted and thin-formed apparatus. Thirdly, it can improve the cost performance of the optical switching device by simplifying the manufacture of the optical switcher. Further, it can realize a high reliability of the device and a rapid response time of the optical switching device.

As described in the foregoings, the inventive photo-driven optical device can improve highly a bulk photostrictive force of the photo-driving elements and further can improve a S/N ratio and a responsibility of the optical switching by using lanthanum added lead titanate-zirconate doped with $WO_3$ up to 2 atomic percent [$WO_3$-doped PLZT(3/52/48)]. Further, the photo-switching apparatus with superior figure of merit can be more easily manufactured.

While the present invention has been described with reference to the particular illustrative embodiments, it is not to be restricted by those embodiments but only the appended claims. It is to be appreciated that those skilled in the art can change or modify the embodiments without departing from the scope and spirit of the present invention.

We claim:

1. A photo-driven switching apparatus in which a light beam is switched or modulated by using only light beam(s), comprising
   (a) a dielectric substrate having "photovoltaic effect";
   (b) one or more couples of electrodes formed in or on at least portions of the surface(s) of said substrate so as to polarize the portion(s) positioned between said couple(s) of the electrodes thereby;
   (c) one or more photo-driving or photo-receiving elements provided at least in the resulting polarized portion(s) of the surface of said dielectric substrate, having a polarization direction arranged at one certain direction, and having a photovoltaic effect so as to generate photo-voltage between each couple of said electrodes;
   (d) a dielectric and electro-optical rotation element comprising a light beam switching passage or modulator having a couple of polarizers, the polarization direction of each of which is perpendicularly crossed or parallel to each other, positioned on the surface of incoming of a light beam to be modulated, and at the outgoing surface of the light beam, and a couple of electrodes formed on a couple of the other surfaces facing to each other of said rotation element to apply an electric field in said element;
   (e) connecting leads connecting electrically each electrode of said couples of electrodes of said photo-driving element(s) respectively to the electrodes of said rotation element; and
   (f) a polarizer positioned on the incoming surface of said rotation element, allowing the light beam to be modulated through said polarizer, said switching passage being operated directly by the photovoltage generated by said photo-driving element(s) which can be operated or switched only by illumination of a light beam to the surface of said photo-driving element(s).

2. The photo-driven switching apparatus in accordance with claim 1, wherein said rotation element has, at the incoming surface and at the outgoing surface for said light beam to be switched or modulated, a couple of polarizers having the polarization directions perpendicularly crossed to each other, and further being at an angle of 45° to the direction of the electrical field applied in the rotation element by the couple of the electrodes positioned at the surfaces facing to each other of the said element.

3. The photo-driven switching apparatus in accordance with claim 1, wherein said photo-driving elements provided at least in portion of the surface of said substrate comprises a couple of optical elements having parallel and opposite polarization direction to each other or the same polarization direction.

4. The photo-driven switching apparatus in accordance with claim 3, wherein said photo-driving element(s) comprises a couple of optical elements, the polarization directions of which are in series, or in loop form, and each of electrodes of said light beam switching passage or modulator is connected through each of said connecting leads to each electrode of said couples of electrodes positioned at both ends of said photo-driving elements.

5. The photo-driven switching apparatus in accordance with claim 1, wherein said photo-receiving element(s) comprises a couple of optical elements, the polarization direction of which are in parallel, and connected in loop form, and each electrode is connected through each of the connecting leads provided on the surface of the substrate.

6. The photo-driven switching apparatus in accordance with claim 1, wherein said light beam to be modulated comes from the direction in which there is no possibility of the beam entering through the surface of the substrate, and a driving light beam incident to said photo-driving elements coming from a direction entirely different from that of the light beam to be modulated.

7. The photo-driven switching apparatus in accordance with claim 6, wherein the incoming surface and the outgoing surface for the light beam to be modulated in said modulator are perpendicular to the surface of said dielectric substrate and the surface of said photo-driving elements is parallel to the surface of said substrate, so that said light beam to be modulated comes from the direction in which there is no possibility of the beam to be modulated entering through the surface of the substrate, and said driving light beam comes from a direction entirely different from that of the light beam to be modulated.

8. The photo-driven switching apparatus in accordance with claim 7, wherein said rotation element is positioned on the surface opposite to the surface of the substrate on which said photo-driving elements are positioned.

9. The photo-driven switching apparatus in accordance with claim 1, wherein said photo-driving element(s) comprises a couple of optical elements, the polarization directions of which are in series, and connected in loop form, and each electrode is connected through each of said connecting leads, said photo-driving elements being provided on the surface opposite to the surface of the substrate on which said modulator is assembled.

10. The photo-driven switching apparatus in accordance with claim 1, wherein said dielectric substrate is made from piezoelectric material having the chemical formula of $$Pb_{0.97}La_{0.03}(Zr_{0.52}Ti_{0.48})_{0.9925}O_3:$$

and said rotation element is made from lanthanum-doped lead titanate zirconate having the chemical formula of $$Pb_{0.91}La_{0.09}(Zr_{0.65}Ti_{0.35})_{0.9775}O_3:$$

* * * * *